Aug. 18, 1931.  J. P. ROGER  1,819,202
TUBE CONNECTION
Filed Dec. 30, 1925

John P. Roger. INVENTOR
BY
Gifford & Scull, ATTORNEYS

Patented Aug. 18, 1931

1,819,202

UNITED STATES PATENT OFFICE

JOHN P. ROGER, OF BARBERTON, OHIO, ASSIGNOR TO THE BABCOCK & WILCOX COMPANY, OF BAYONNE, NEW JERSEY, A CORPORATION OF NEW JERSEY

TUBE CONNECTION

Application filed December 30, 1925. Serial No. 78,423.

Figure 1:
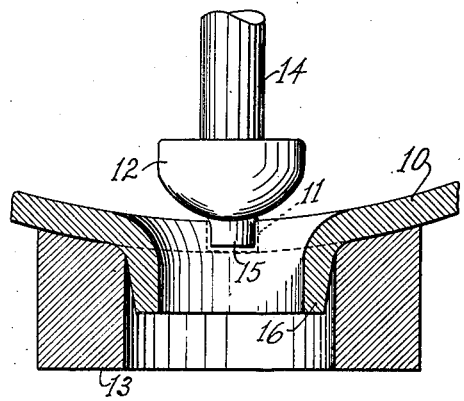
Figure 2:
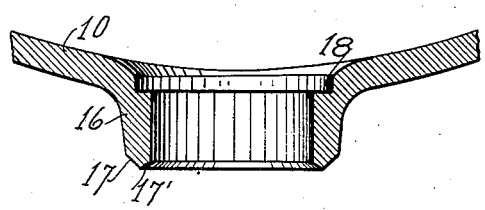
Figure 3:
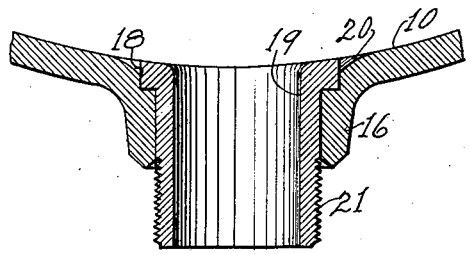
Figure 4:
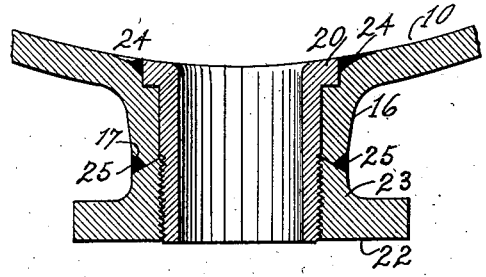

This invention relates to connections between metal containers or the like, and tubes or pipes that are to be connected thereto. It relates more particularly to the formation of connections between boilers or drums or headers and tubes for the same, or between square boxes and blow-off elbows. The invention will be understood from the description in connection with the accompanying drawings, in which Fig. 1 is a section showing one step in the preparation of the metal for making a connection thereto; Fig. 2 is a similar view showing a further step; Fig. 3 is a similar view showing a sleeve mounted in the metal and Fig. 4 is a similar view showing the completed device.

In the drawings, reference character 10 represents a portion of a metal plate that may, for example, constitute part of a boiler or header or drum. A hole 11, as shown in dotted lines in Fig. 1, is provided in the plate, and a flanging ball 12 of hardened metal is placed upon the plate at the hole, the plate being heated around the hole to a temperature that will permit a flange to be formed, and the plate rests upon the die 13. The pusher pin 14 of a press is inserted through a hole in the flanging ball 12 with its shoulder resting upon the ball and its reduced end 15 entering the hole 11. The pressure of the press is then applied and the ball is then pressed downwardly into the die, thus forcing the metal of the plate downwardly and outwardly around the hole 10 from the dotted line position to the full line position in Fig. 1, so as to form the wall or flange 16. The metal plate 10 is then removed from the die and the inside surface of the flanged portion is bored smooth and counterbored, as shown at 18, to form a seat for a connecting flange, as will be presently described. The flanged portion 16 is beveled along its outer end, as shown at 17 and 17'.

A connecting member or sleeve 19 having a shoulder 20 is then forced into the opening, the outside diameter of the sleeve being sufficiently large to fit tightly in the opening, until the flange 20 is seated in the countersunk portion 18. The sleeve 19 is threaded, as shown at 21, and an internally threaded connecting member 22 having a beveled wall or flange 23 is screwed on to the sleeve 19 until the beveled ends of the flanges 16 and 23 contact. The sleeve 19 is then welded to the metal 10, as shown at 24, and the ends of the flanges 16 and 23 are welded together, as shown at 25, to conform to the lines of the fitting and the metal, thus producing an integral structure. Tubes or pipes may then be bolted to the connecting member 22 in a manner well-known to those skilled in the art.

I claim:—

1. In combination, a plurality of tubular metallic members having alined openings of substantially equal diameter, a sleeve extending through said openings, and a welded joint between the walls of said openings.

2. In combination, a plurality of metallic members having openings of substantially equal diameter and surrounded by flanges disposed axially thereof with the edges of the flanges adjacent each other, a sleeve extending through said openings and engaging said flanges, and a welded joint uniting the adjacent edges of said flanges.

3. In combination, a plurality of metallic members having openings of substantially equal diameter and surrounded by flanges disposed axially thereof with the edges of the flanges adjacent each other, a sleeve extending through said openings and engaging said flanges, a welded joint uniting the adjacent edges of said flanges, and a welded joint between said sleeve and one of said members.

4. In combination, two metallic members having alined openings surrounded by flanges extending axially thereof, and a sleeve extending through said openings, said sleeve being welded to one of said members.

5. In combination, two metallic members having alined openings surrounded by flanges extending axially thereof and with the edges of the flanges adjacent each other, a sleeve extending through said openings, said sleeve being welded to one of said members and threaded to the other, and a welded joint between the adjacent edges of said flanges.

6. In combination, two metallic members having alined openings surrounded by flanges extending axially thereof and with the edges of the flanges adjacent each other, one of said openings being surrounded by a counterbore forming a seat, a sleeve extending through said openings and having a flange disposed on said seat, a welded joint between said flange and the member on which it is seated, a threaded connection between said sleeve and the other of said members, and a welded joint between the adjacent edges of said flanges.

JOHN P. ROGER.